United States Patent
Pump

(10) Patent No.: US 9,353,846 B2
(45) Date of Patent: May 31, 2016

(54) POWER TRANSMITTING COMPONENT WITH TORQUE TRANSFER DEVICE CONFIGURED WITH FLUID EVACUATION AND LUBRICATION SYSTEM

(71) Applicant: American Axle & Manufacturing, Inc., Detroit, MI (US)

(72) Inventor: Christopher D. Pump, Macomb, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 127 days.

(21) Appl. No.: 14/463,758

(22) Filed: Aug. 20, 2014

(65) Prior Publication Data

US 2015/0057124 A1   Feb. 26, 2015

Related U.S. Application Data

(60) Provisional application No. 61/869,415, filed on Aug. 23, 2013.

(51) Int. Cl.
| | |
|---|---|
| *F16H 57/04* | (2010.01) |
| *F16H 48/22* | (2006.01) |
| *F16H 48/06* | (2006.01) |
| *F16H 48/08* | (2006.01) |
| *F16D 48/02* | (2006.01) |

(52) U.S. Cl.
CPC ............... *F16H 48/22* (2013.01); *F16H 48/06* (2013.01); *F16H 48/08* (2013.01); *F16H 57/042* (2013.01); *F16H 57/045* (2013.01); *F16H 57/0409* (2013.01); *F16H 57/0427* (2013.01); *F16H 57/0473* (2013.01); *F16H 57/0483* (2013.01); *F16D 2048/0218* (2013.01)

(58) Field of Classification Search
CPC .............................................. F16D 2048/0218
See application file for complete search history.

(56) References Cited

U.S. PATENT DOCUMENTS

| | | |
|---|---|---|
| 2,270,482 A | 1/1942 | Stolte |
| 3,366,210 A | 1/1968 | Webster |
| 3,366,211 A | 1/1968 | May |
| 3,768,613 A | 10/1973 | Brunner |
| 4,023,661 A | 5/1977 | Flotow |
| 4,270,647 A | 6/1981 | Leber |
| 4,382,497 A | 5/1983 | Sakai et al. |
| 4,413,716 A | 11/1983 | Newsome et al. |
| 4,458,793 A | 7/1984 | Riese et al. |
| 4,544,055 A | 10/1985 | Kronstadt |
| 4,751,989 A | 6/1988 | Shinokawa et al. |

(Continued)

FOREIGN PATENT DOCUMENTS

JP    2007016892 A    1/2007

*Primary Examiner* — Erin D Bishop
(74) *Attorney, Agent, or Firm* — Harness, Dickey & Pierce, P.L.C.

(57) ABSTRACT

A power transmitting component can include a differential, a first sump, a clutch assembly, a reservoir, a pump, and a fluid circuit. The pump can operate in a first mode to pump fluid from a reservoir to the piston chamber to move the piston to a second position. The pump can operate in a second mode to pump fluid from the piston chamber to the reservoir to move the piston to a first position. The fluid circuit can fluidly couple the reservoir to the first sump when the piston is in the first position and the pump is operated in the second mode. The pump can be configured to pump fluid from the first sump through the fluid circuit when the fluid circuit fluidly couples the first sump and the reservoir.

20 Claims, 8 Drawing Sheets

(56) References Cited

U.S. PATENT DOCUMENTS

| | | | |
|---|---|---|---|
| 4,873,880 | A | 10/1989 | Amedei et al. |
| 5,131,514 | A | 7/1992 | Machida |
| 5,518,098 | A | 5/1996 | Zanetel et al. |
| 6,189,669 | B1 | 2/2001 | Kremer et al. |
| 6,543,596 | B2 | 4/2003 | Martin et al. |
| 6,550,595 | B2 | 4/2003 | Kuczera |
| 6,840,363 | B2 | 1/2005 | Braford, Jr. et al. |
| 6,942,055 | B2 * | 9/2005 | Forsyth ............ B60K 17/34 180/249 |
| 6,997,299 | B2 | 2/2006 | Brissenden et al. |
| 7,001,298 | B2 | 2/2006 | Biermann et al. |
| 7,294,086 | B2 | 11/2007 | Brissenden et al. |
| 7,416,069 | B2 | 8/2008 | Tiesler |
| 8,215,440 | B2 | 7/2012 | Hoffmann et al. |
| 2008/0128212 | A1 | 6/2008 | Utzat et al. |
| 2008/0214355 | A1 | 9/2008 | Capito et al. |
| 2010/0274456 | A1 | 10/2010 | Kondo et al. |

* cited by examiner

POWER TRANSMITTING COMPONENT WITH TORQUE TRANSFER DEVICE CONFIGURED WITH FLUID EVACUATION AND LUBRICATION SYSTEM

CROSS-REFERENCE TO RELATED APPLICATIONS

This application claims the benefit of U.S. Provisional Application No. 61/869,415, filed on Aug. 23, 2013. The entire disclosure of the above application is incorporated herein by reference.

FIELD

The present disclosure relates to a power transmitting component with a torque transfer device that is configured with a fluid evacuation and lubrication system.

BACKGROUND

This section provides background information related to the present disclosure which is not necessarily prior art.

Power transmitting components with a torque transfer device, such as a disconnecting drive module in an all wheel drive ("AWD") system, generally include a clutch with a plurality of friction plates and a piston for selectively engaging the friction plates. The friction plates are generally bathed in a fluid to provide lubrication and cooling of the plates when the clutch is engaged. When the clutch is disengaged, the plates are generally separated. When separated, excess fluid between the plates and within a clutch sump through which the plates rotate, can increase the system drag torque. It is advantageous to decrease the amount of system drag torque. Minimizing the level of fluid within the clutch sump can reduce the amount of drag torque from the clutch. However, sufficient fluid must be available during engagement of the clutch to prevent excessive temperatures and plate damage. Additionally, it has been found that minimum drag torque in a plate clutch can be achieved when the plates have sufficient separation and there is an air-clutch fluid mix between the plates. As a result, it can be difficult to maintain the optimal amount of fluid within the clutch during both engagement and disengagement.

SUMMARY

This section provides a general summary of the disclosure, and is not a comprehensive disclosure of its full scope or all of its features.

The present teachings provide for a power transmitting component including a first output member, a second output member, a housing, an input member, a differential, a clutch assembly, a reservoir, a pump, and a fluid circuit. The housing can define a first sump. The input member can be configured to receive rotational power and rotate about a first axis. The differential can include a differential case and a differential gearset. The differential gearset can be configured to transmit rotary power between the differential case and the first and second output members. The clutch assembly can include a piston chamber, a piston, and a plurality of interleaved clutch plates. The piston can be configured to move between a first position and a second position. The clutch plates can be configured to rotate through the first sump and can transmit torque between the input member and the differential case when the piston is in the second position. The reservoir can be configured to hold a fluid. The pump can operate in a first mode, wherein the pump can pump the fluid from the reservoir to the piston chamber. The pump can operate in a second mode wherein the pump can pump the fluid from the piston chamber to the reservoir. The fluid circuit can fluidly couple the reservoir to the first sump when the piston is in the first position and the pump is operated in the second mode. The pump can be configured to pump fluid from the first sump through the fluid circuit when the fluid circuit fluidly couples the first sump and the reservoir.

The present teachings further provide for a power transmitting component including a first output member, a second output member, a housing, an input member, a differential, a clutch assembly, a reservoir, a pump, and a first valve. The housing can define a first sump. The input member can be configured to receive rotational power and rotate about a first axis. The differential can include a differential case and a differential gearset. The differential gearset can be configured to transmit rotary power between the differential case and the first and second output members. The clutch assembly can include a piston chamber, a piston, and a plurality of interleaved clutch plates. The piston can be configured to move between a first position and a second position. The clutch plates can be configured to rotate through the first sump and can transmit torque between the input member and the differential case when the piston is in the second position. The reservoir can be configured to hold a fluid. The pump can operate in a first mode wherein the pump can pump fluid from the reservoir to the piston chamber. The pump can operate in a second mode wherein the pump can pump fluid from the first sump to the reservoir. The first valve can be in fluid communication with the first sump and the pump. The first valve can have a valve body and a valve element. The valve element can be received in the valve body and can be moved between a first valve element position and a second valve element position. In the first valve element position, the valve element can permit fluid communication through the valve body. In the second valve element position, the valve element can inhibit fluid communication through the valve body. The valve element can be configured to be positioned in the first valve element position when the pump operates in the second mode.

The present teachings further provide for a power transmitting component including a first output member, a second output member, a housing, an input member, a differential, a clutch assembly, and a centrifugal dam. The housing can define a first sump and a second sump. The input member can be configured to receive rotational power and rotate through the second sump about a first axis. The differential can include a differential case and a differential gearset. The differential gearset can be configured to transmit rotary power between the differential case and the first and second output members. The clutch assembly can include a piston chamber, a piston, and a plurality of interleaved clutch plates. The piston can be configured to move between a first position and a second position. The clutch plates can be configured to rotate through the first sump and can transmit torque between the input member and the differential case when the piston is in the second position. The centrifugal dam can include a first body and a door element. The first body can be coupled for common rotation with the input member. The door element can be configured to move between a first door position wherein the centrifugal dam can limit fluid flow through an annular cavity and a second door position wherein the centrifugal dam can permit fluid flow through the annular cavity. The annular cavity can be at least partially defined by the housing and a component coupled for common rotation with the input member. The annular cavity can fluidly couple the first and second cavities. The door element can be configured to be in the first door position when the input member rotates at a rotational speed less than a predetermined rotational speed. Centrifugal force can move the door element to the second door position when the input member rotates at a rotational speed greater than or equal to the predetermined rotational speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
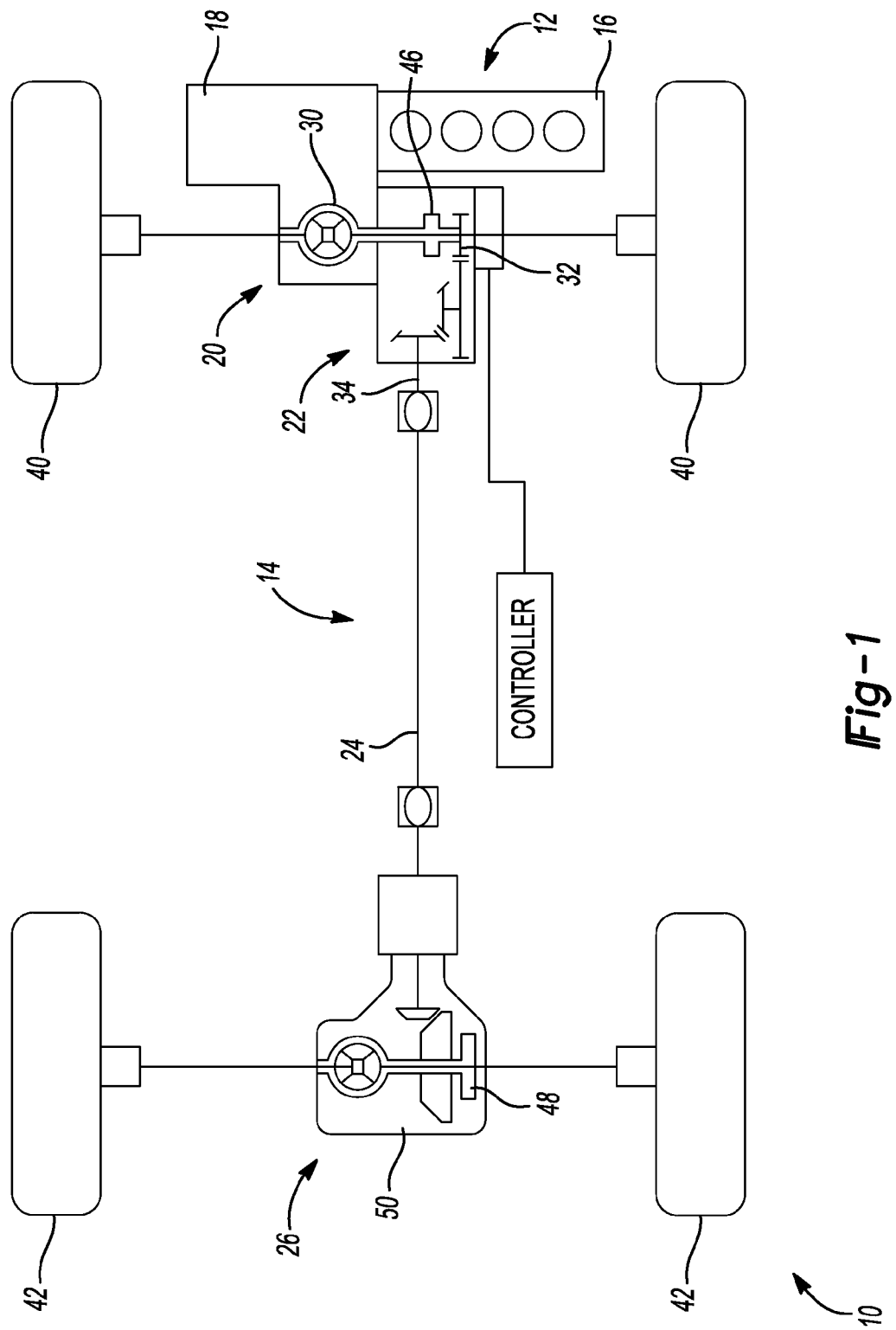
FIG. 1 is an exemplary vehicle having a power transmitting component constructed in accordance with the present teachings.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive ("AWD") configuration, but those of skill in the art will appreciate that the teachings of the present disclosure are applicable to other drive train configurations, including four-wheel drive ("4WD") configurations, two-wheel drive ("2WD"), rear-wheel drive configurations ("RWD"), and front-wheel drive ("FWD") configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. Alternatively, the drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a power transmitting component) that is constructed in accordance with the teachings of the present disclosure. It will be appreciated, however, that the teachings of the present disclosure have application to various other power transmitting components, such as transmissions, power take-offs, torque transfer devices, transfer cases, front axle assemblies, center bearing assemblies for propshafts and any other power transmitting components that have a housing, a shaft and a shaft seal.

Figure 2:
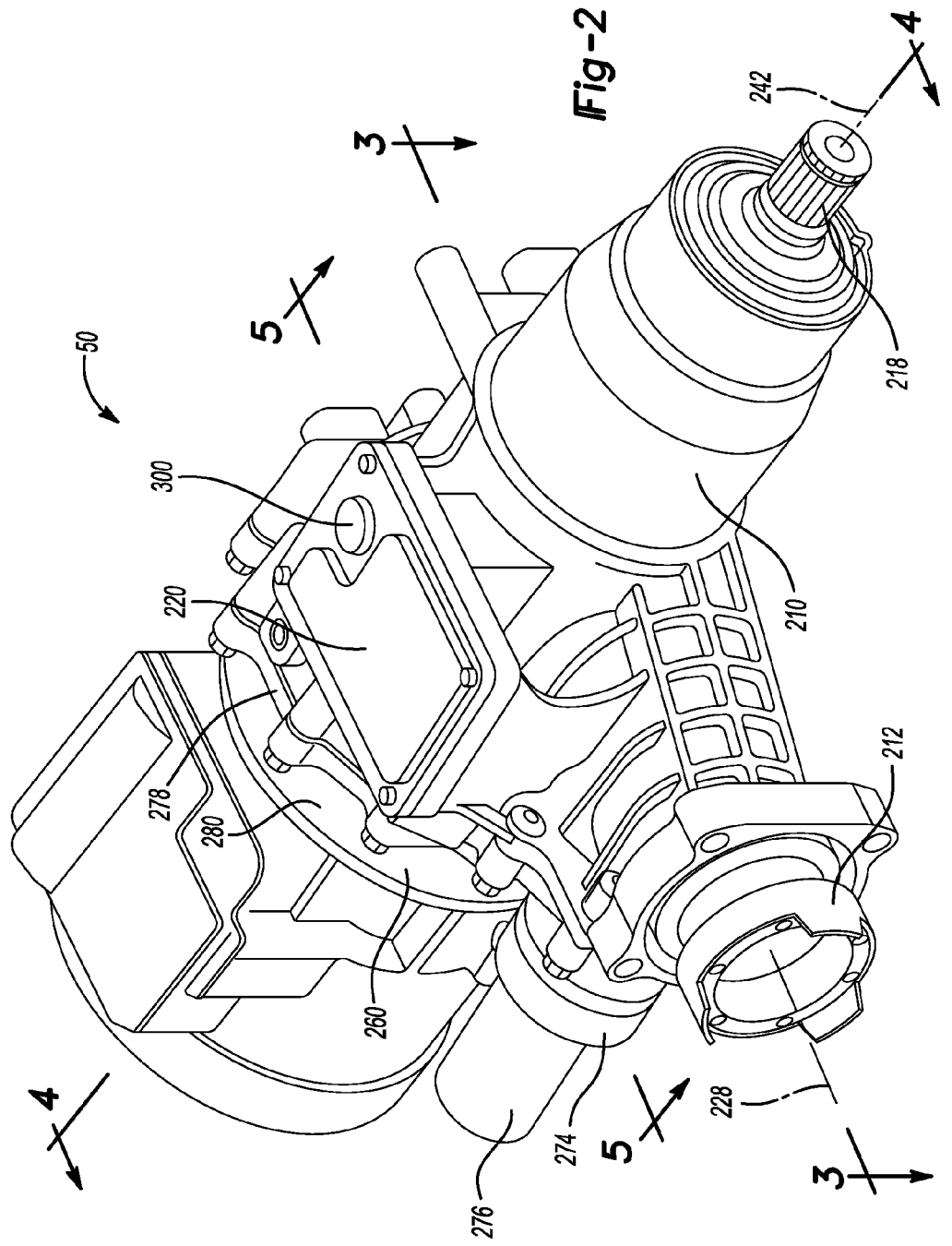
FIG. 2 is a perspective view of the power transmitting component of FIG. 1.
Figure 3:
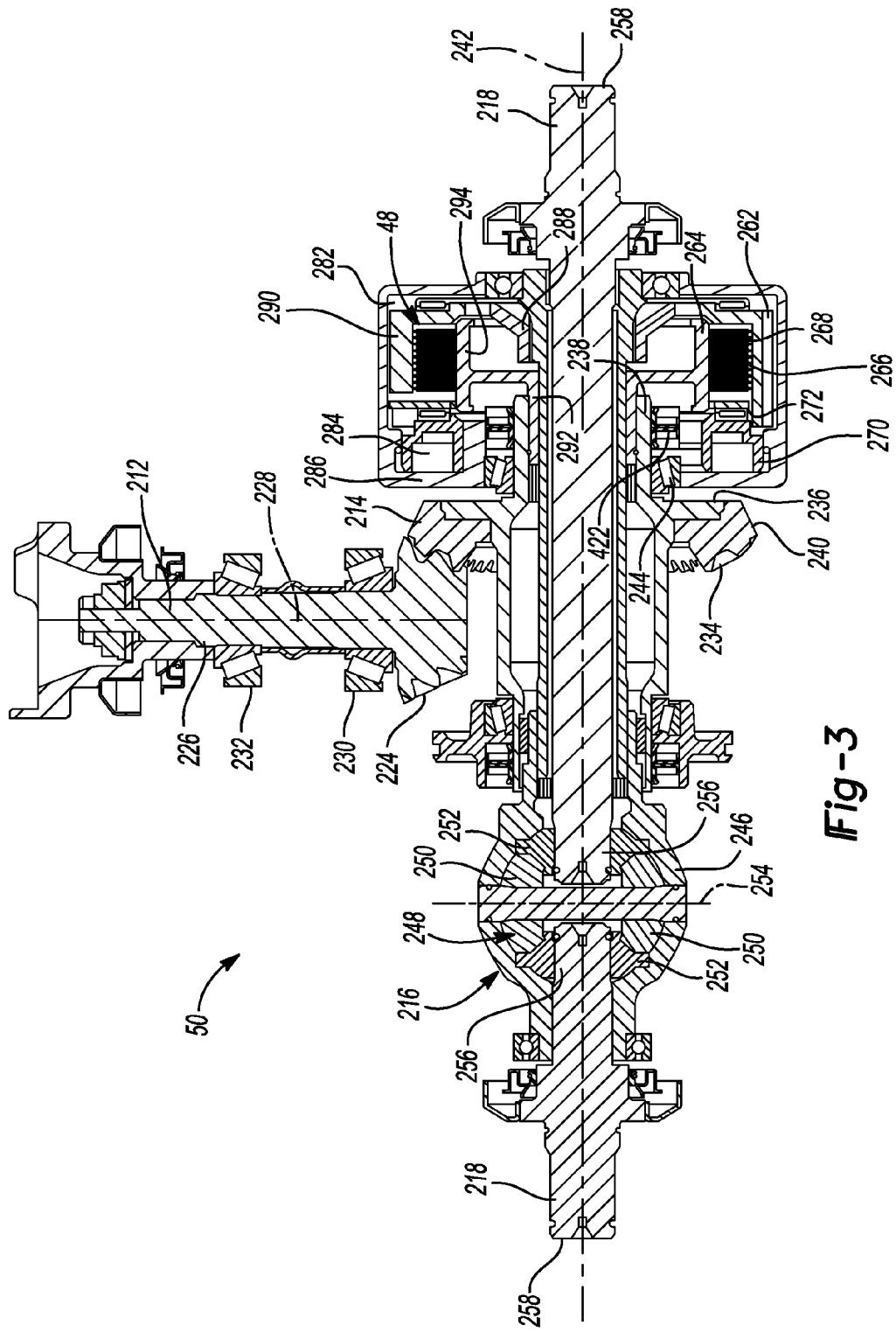
FIG. 3 is a cross-sectional view taken along line 3-3 of FIG. 2.

With reference to FIGS. 2 and 3, the rear drive module 50 is illustrated in more detail. The rear drive module 50 can include a housing 210, an input pinion 212, an input member 214, the second clutch 48, a differential assembly 216, a pair of output shafts 218, and a reservoir 220. The input pinion 212, input member 214, the second clutch 48, the differential assembly 216, output shafts 218, and reservoir 220 can be constructed in a manner that is disclosed in co-pending U.S. patent application Ser. No. 13/470,941 and as such, a detailed discussion of these components is not needed herein. Briefly, the housing 210 can define a first cavity 222 (shown in FIG. 4) and the input pinion 212 can be a hypoid pinion having a hypoid gear 224 and an input pinion shaft 226. The hypoid gear 224 can be disposed within the first cavity 222. The input pinion shaft 226 can be supported for rotation in the housing 210 along a first axis 228 by a head bearing 230 proximate to the hypoid gear 224 and a tail bearing 232 distal to the hypoid gear 224 and proximate to the prop shaft 24. The input member 214 can be a ring gear having a gear face 234, a back side 236, an axially extending portion 238, and an outer periphery 240. The axially extending portion 238 can be supported for rotation in the housing 210 about a second axis 242 by a bearing 244. The second axis 242 can be generally perpendicular to the first axis 228. The gear face 234 can be meshingly engaged with the input pinion 212.

The differential assembly 216 can include a differential case 246 and a differential gearset 248. The differential case 246 can be configured for rotation about the second axis 242. The differential gearset 248 can be configured to transmit rotary power between the differential case 246 and the output shafts 218. In the example provided, the differential gearset 248 includes a pair of side gears 250 and a pair of output gears 252 disposed within the differential case 246. The side gears 250 can be coupled for rotation with the differential case 246 about the second axis 242 and coupled for rotation relative to the differential case 246 about a third axis 254. The third axis 254 can be generally perpendicular to the second axis 242. The output gears 252 can be meshingly engaged with the side gears 250 and configured to rotate about the second axis 242. Each of the output shafts 218 can have a first end 256, which can be drivingly coupled to a respective one of the output gears 252, and a second, opposite end 258 that can be coupled to a corresponding one of the rear wheels 42 (FIG. 1).

The second clutch 48 can be selectively operated to transmit rotary power from the input member 214 to the differential case 246. In the particular example provided, the second clutch 48 is a friction clutch that is mounted co-axially with the input member 214 and the differential assembly 216. The second clutch 48 can include a clutch housing 260, an outer clutch plate carrier 262, an inner clutch plate carrier 264, a plurality of first clutch plates 266, a plurality of second clutch plates 268, a piston 270, an apply plate 272, a pump 274 and a pump motor 276. The clutch housing 260 can be integrally formed with or partially formed by the housing 210 of the rear drive module 50 or can be mounted to the housing 210. The clutch housing 260 can include a first side 278 and a second side 280 that can define a second cavity 282 and a piston chamber 284. The first side 278 can include a wall 286 that can separate the first cavity 222 from the second cavity 282. The outer and inner clutch plate carriers 262, 264 and the first and second clutch plates 266, 268 can be received in the second cavity 282. The outer clutch plate carrier 262 can have an inner portion 288 and an outer portion 290. The inner portion can be non-rotatably coupled to the differential case 246 and the plurality of first clutch plates 266 can be non-rotatably coupled to the outer portion 290. The inner clutch plate carrier 264 can have an inner portion 292 and an outer portion 294. The inner portion 292 can be non-rotatably coupled to the axially extending portion 238 of the input member 214 and the plurality of second clutch plates 268 can be non-rotatably coupled to the outer portion 294 and interleaved with the first clutch plates 266 radially between the outer portions 290, 294 of the outer and inner clutch plate carriers 262, 264.

The piston 270 can be received in the piston chamber 284 and configured to translate along the second axis 242. The piston 270 can be configured to move within the piston chamber 284 between an extended position and a retracted position relative to the plurality of first and second clutch plates 266, 268. The pump 274 can be mounted to the housing 210 proximate to the pinion shaft 226 in a space generally between the housing 210 and the clutch housing 260. The pump motor 276 can be a 2-way servo motor capable of running in forward and reverse and can be drivingly coupled to the pump 274 to selectively operate the pump 274. The pump 274 and pump motor 276 can extend radially outward from the first axis, generally parallel to the ground (not shown) and second axis 242, and above the bottom of the housing 210 and clutch housing 260. The pump 274 can be fluidly coupled to the reservoir 220 by a first pump conduit 296 and fluidly coupled to the piston chamber 284 by a second pump conduit 298. In the example provided, the pump conduits 296, 298 are defined by the housing 210. The pump 274 can be configured to supply a hydraulic fluid from the reservoir 220 to the piston chamber 284 to move the piston 270 from the retracted position to the extended position. The pump can be configured to selectively remove hydraulic fluid from the piston chamber 284 to the reservoir 220 to move the piston 270 from the extended position to the retracted position. The reservoir 220 can be mounted to the housing 210 proximate to the top of the housing 210 and above the first cavity 222. Alternatively, the reservoir 220 can be integrally formed with the housing 210. The reservoir 220 can also include a vent 300 that can vent gasses to the atmosphere.

The apply plate 272 can be disposed in the second cavity 282 between the piston 270 and the plurality of first and second clutch plates 266, 268. The piston 270 can be configured to translate the apply plate 272 along the second axis 242 to selectively engage the first and second clutch plates 266, 268 to compress the first and second clutch plates 266, 268 against one another so that the second clutch 48 can transmit rotary power between the input member 214 and the differential case 246. It will be appreciated that the second clutch 48 can be configured to not transmit rotary power between the input member 214 and the differential case 246 when the piston 270 is retracted.

Figure 4:
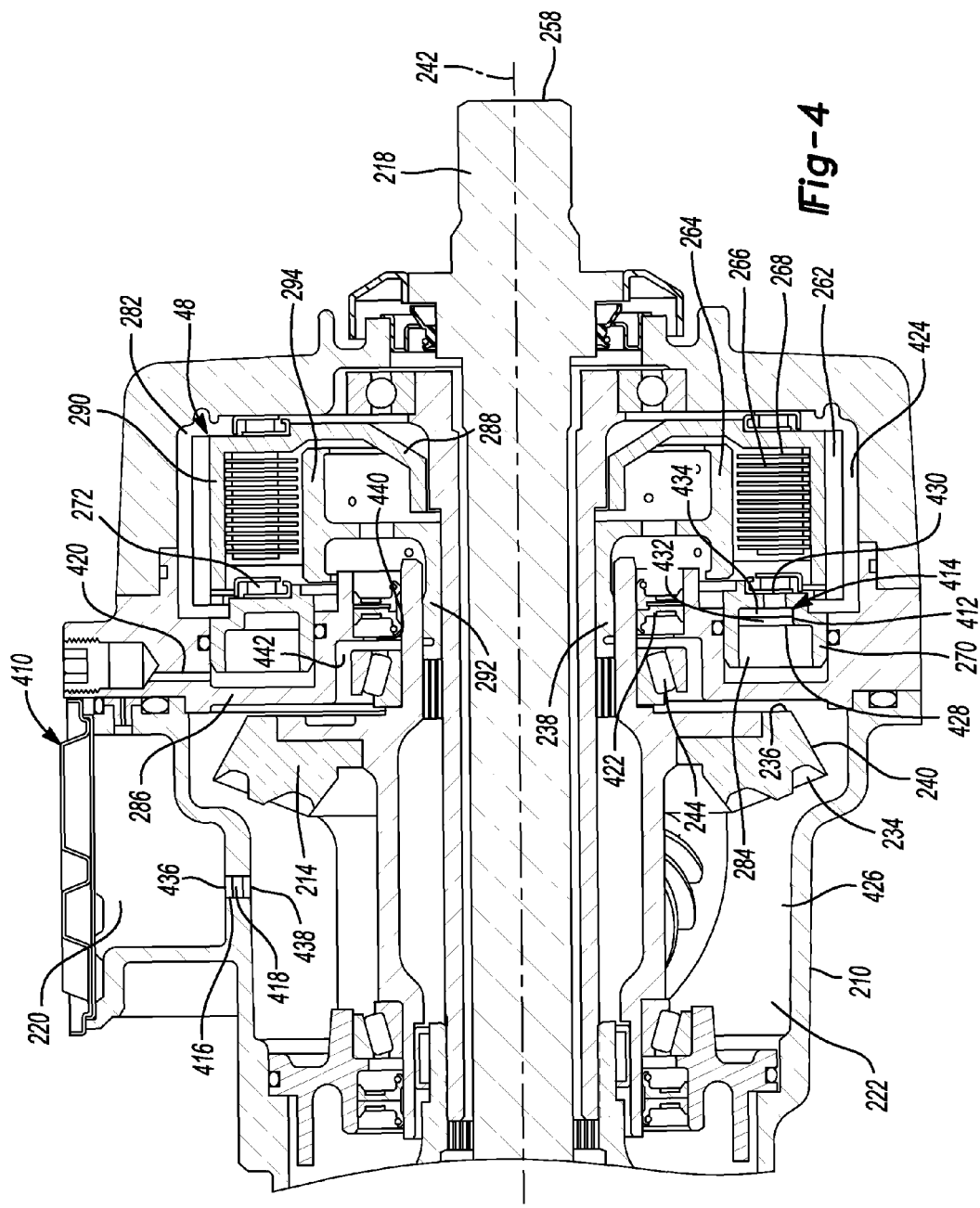
FIG. 4 is a partial cross-sectional view taken along the line 4-4 of FIG. 2.
Figure 5:
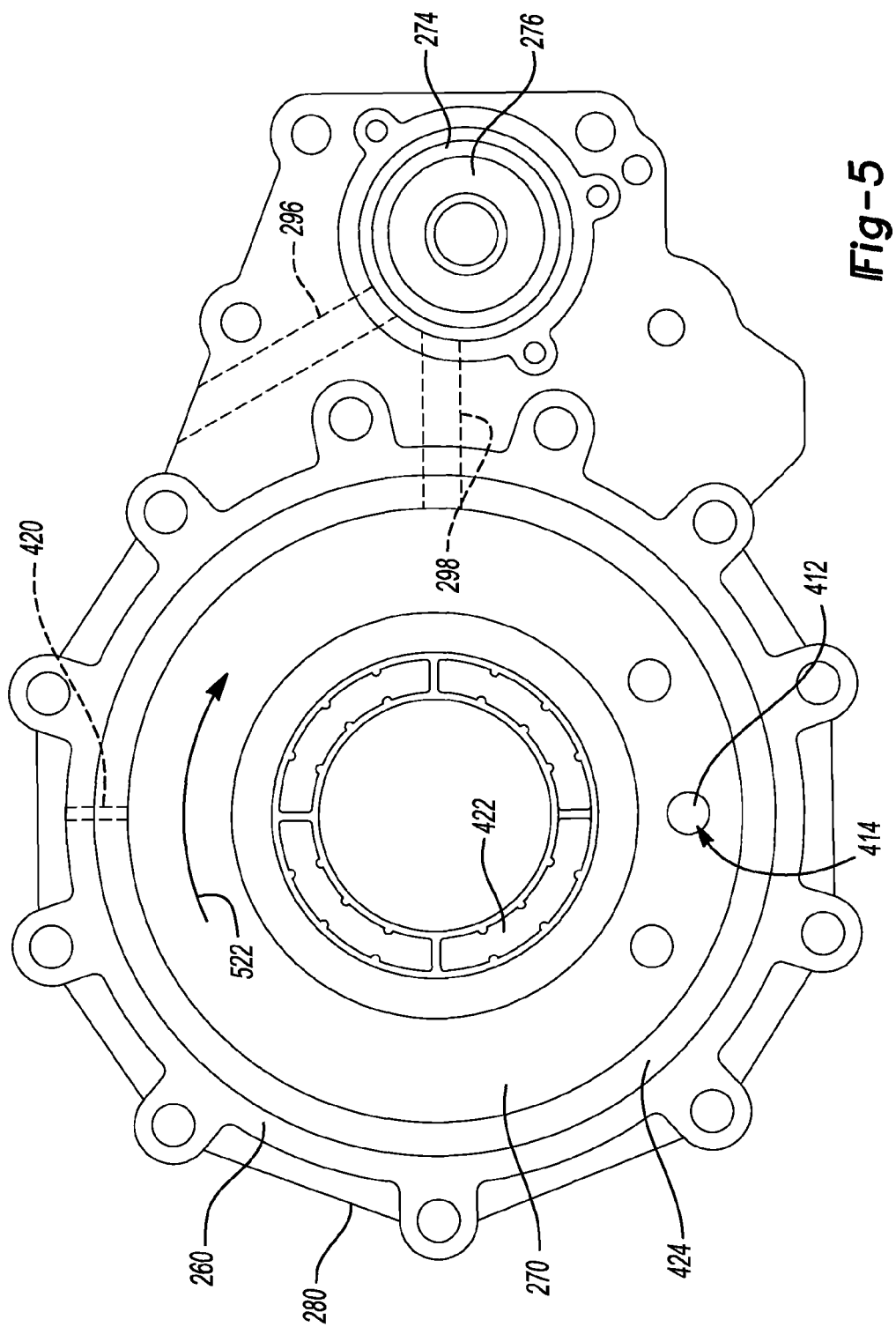
FIG. 5 is a side elevation view of a portion of the power transmitting unit of FIG. 1 illustrating a portion of a housing of a clutch assembly.

With additional reference to FIGS. 4-5, a drag reduction system 410 is shown. The drag reduction system 410 can include a sump conduit 412, a first valve 414, a reservoir conduit 416, a second valve 418, and a bleed conduit 420. The drag reduction system 410 can also include a centrifugal dam 422. A lower portion of the second cavity 282 can define a clutch sump 424 wherein a lubricant fluid can collect when the outer clutch plate carrier 262 is not rotating, and a lower portion of the first cavity 222 can define a hypoid sump 426 wherein a lubricant fluid can collect when the input member 214 is not rotating. The hydraulic fluid used to actuate the piston 270 and the lubricant fluid used to cool and lubricate the second clutch 48 and input member 214 and input pinion 212 can be the same type of fluid.

The sump conduit 412 can fluidly couple the clutch sump 424 with the piston chamber 284. The sump conduit 412 can be defined by the piston 270 and can extend through the piston 270. The sump conduit 412 can have a first opening 428 open to the piston chamber 284 and a second opening 430 open to the clutch sump 424. The second opening 430 can be located proximate to the bottom of the clutch sump 424.

The first valve 414 can be disposed fluidly in-line with the sump conduit 412 and can be configured to allow fluid communication between the clutch sump 424 and the piston chamber 284, through the sump conduit 412, when the first valve 414 is open. The first valve 414 can be configured to prevent fluid communication between the clutch sump 424 and the piston chamber 284, through the sump conduit 412, when the first valve 414 is closed. In the examples provided, the first valve 414 is a check valve, having a valve body 432 and a valve element 434 received in the valve body 432 and being moveable between a first position which permits fluid communication through the valve body 432, and a second position which inhibits fluid communication through the valve body 432. It is understood that other types of valves can be used, such as an electronically controlled valve or a pilot valve for example. The first valve 414 can be configured to open when a pressure differential between the clutch sump 424 and the piston chamber 284 is greater than a predetermined pressure differential and to close when the pressure differential is less than or equal to the predetermined pressure differential. The first valve 414 can also be a one way valve configured to prevent fluid from flowing from the piston chamber 284 to the clutch sump 424. The first valve 414 can be mounted to the piston 270 for axial movement therewith.

Figure 7:
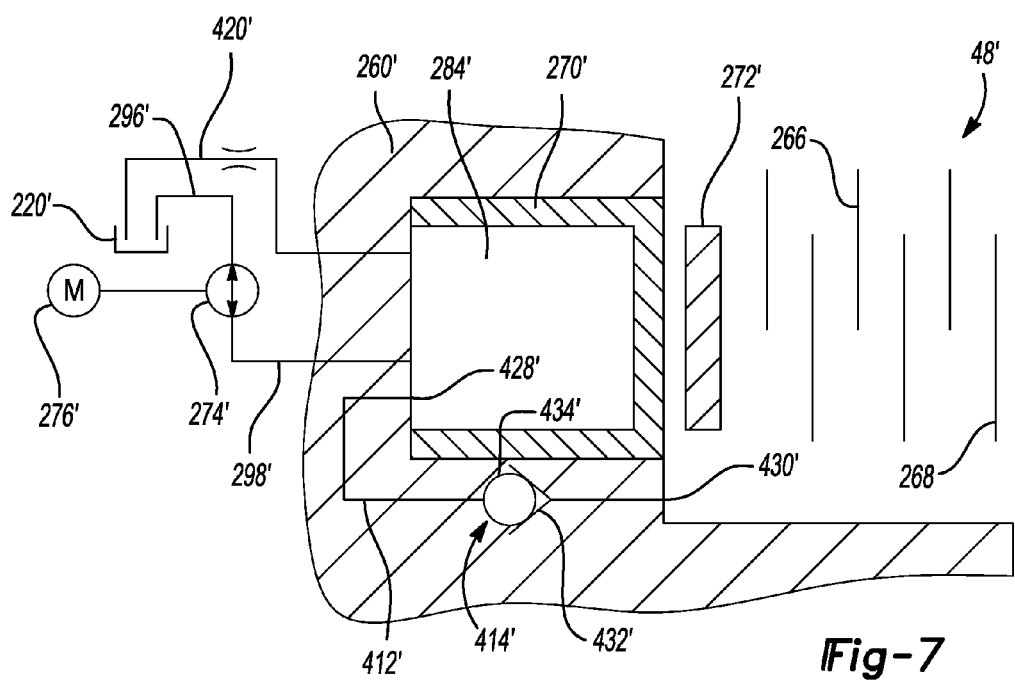
FIG. 7 is a schematic sectional view of a portion of the power transmitting unit of FIG. 1, illustrating an exemplary hydraulic circuit of the clutch assembly.

With reference to FIG. 7, a portion of a second power transmitting unit 50' is shown with a second drag reduction system 410'. Power transmitting unit 50' and drag reduction system 410' are similar to power transmitting unit 50 and drag reduction system 410 and similar primed numbers correspond to similar features. Accordingly, their corresponding descriptions are incorporated by reference and only differences will be discussed. As shown in FIG. 7, the sump conduit 412' can alternatively be defined by the clutch housing 260'. In the example provided, the first valve 414' is mounted to the clutch housing 260'. Alternatively, in an example not specifically shown, a portion of the piston 270 can operate as the first valve 414', such that the piston 270' physically blocks the sump conduit 412' when in the extended position, while allowing fluid flow through the sump conduit 412' when in the retracted position.

Returning to FIGS. 4-5, the reservoir conduit 416 can fluidly couple the reservoir 220 with the first cavity 222. The reservoir conduit 416 can have a third opening 436 open to the reservoir 220, and a fourth opening 438 open to the first cavity 222. In the example provided, the reservoir conduit 416 is defined by the housing 210. The third opening 436 can be proximate to a bottom of the reservoir 220. The fourth opening 438 can be proximate to a top of the first cavity 222. The fourth opening 438 can be configured to supply fluid to the hypoid sump 426 or onto either or both of the input member 214 and the input pinion 212.

The second valve 418 can be disposed in-line with the reservoir conduit 416 and can be configured to allow fluid communication between the reservoir 220 and the first cavity 222, through the reservoir conduit 416, when the second valve 418 is open. The second valve can be configured to prevent fluid communication between the reservoir 220 and the first cavity 222, through the reservoir conduit 416, when the second valve 418 is closed. In the example provided, the second valve 418 is an electronically controlled valve, though other types of valves can be used, such as a check valve, float valve, or pilot valve for example. The second valve 418 can be configured to open when a volume of fluid in the reservoir 220 is greater than a predetermined volume of fluid, or when a pressure in the reservoir 220 exceeds a predetermined reservoir pressure. The second valve 418 can be configured to be closed when the volume of fluid in the reservoir 220 is less than or equal to the predetermined volume of fluid, or when the pressure in the reservoir 220 is less than or equal to a predetermined reservoir pressure.

The bleed conduit 420 can fluidly couple the reservoir 220 to the piston chamber 284 separate from the pump conduit 296. The bleed conduit 420 can have a small diameter relative to the pump conduit 296, such that fluid and/or air can be continuously bled from the piston chamber 284 through the bleed conduit 420 when fluid is pumped through the pump conduit 296 to the piston chamber 284 without inhibiting the operation of the piston 270. The bleed conduit 420 can be proximate to the top of the piston chamber 284 relative to the ground (not shown) when the vehicle 10 is on a flat, level surface, to allow any air trapped in the piston chamber 284 to be bled from the piston chamber 284 into the reservoir 220, where the air can be vented to the atmosphere through vent 300.

The centrifugal dam 422 can be disposed radially between the clutch housing 260 and at least one of the axially extending portion 238 of the input member 214 or the inner portion 292 of the inner clutch plate carrier 264, and can be disposed in an annular cavity 440 formed between the clutch housing 260 and the axially extending portion 238 or the inner portion 292. The centrifugal dam 422 can be configured to allow fluid communication between the annular cavity 440 and the second cavity 282 when the centrifugal dam 422 is in an open state. The centrifugal dam 422 can be configured to limit fluid communication between the annular cavity 440 and the second cavity 282 when the centrifugal dam 422 is in a closed state. The centrifugal dam 422 can be configured to be in the open state when the input member 214 rotates at a rotational speed equal to or greater than a predetermined rotational speed and to be in the closed state when the input member 214 does not rotate or rotates at a rotational speed below the predetermined rotational speed. The annular cavity 440 can be in fluid communication with the first cavity through the bearing 244 or a bypass conduit 442 configured to bypass the bearing 244 and fluidly couple the first cavity 222 with the annular cavity 440.

Figure 6:
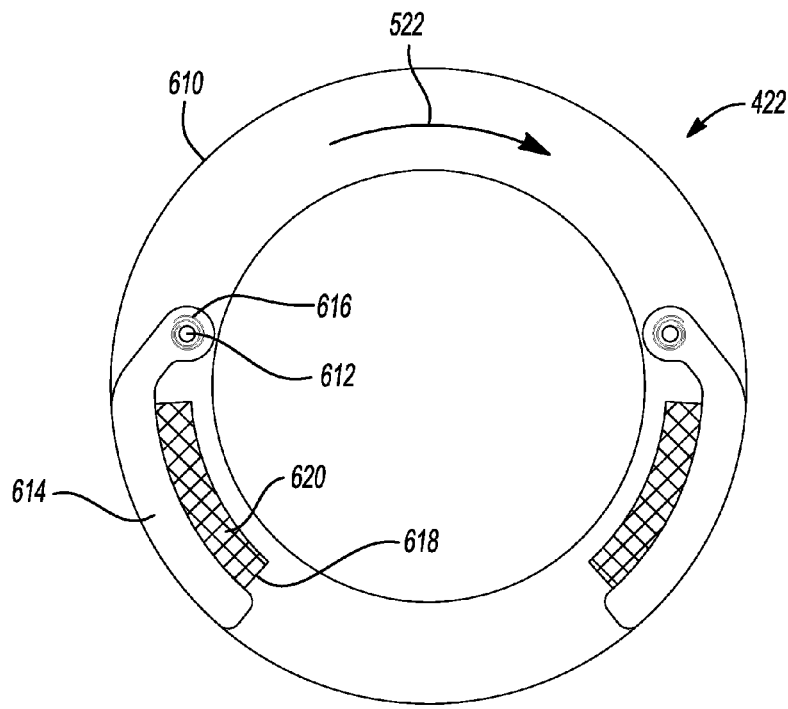
FIG. 6 is a schematic view of a portion of the power transmitting unit of FIG. 1, illustrating a portion of the housing of the clutch assembly and a first drag reduction system in more detail.

With additional reference to FIG. 6, the centrifugal dam 422 is illustrated in more detail. The centrifugal dam 422 can include a main body 610, a pivot 612 and at least one door element 614. The centrifugal dam 422 can also include a biasing member 616. The main body 610 can be coupled to the axially extending portion 238 of the input member 214 or the inner portion 292 of the inner clutch plate carrier 264 for common rotation about the second axis 242. In the example provided, the main body 610 is generally annular in shape and extends radially between the axially extending portion 238 and the clutch housing 260, while being rotatable relative to the clutch housing 260. The main body 610 can define at least one fluid aperture 618. The fluid aperture 618 can extend through the main body 610. In the example provided, the fluid aperture 618 is generally arcuate in shape, though other configurations can be used. A screen 620 can be disposed in the fluid aperture 618 to limit debris from passing through the fluid aperture 618 while allowing fluid to pass through the fluid aperture 618. In the example provided, the screen 620 is a wire mesh. The pivot 612 can rotatably couple the door element 614 to the main body 610 to allow the door element 614 to pivot about the pivot 612 between a closed position and an open position. The door element 614 can be configured to inhibit flow of fluid through the fluid aperture 618 when in the closed position and to allow flow of fluid through the fluid aperture 618 when in the open position. In the example provided, the door element 614 is generally arcuate in shape and configured to cover the generally arcuate shape of the fluid aperture 618, though other configurations can be used. The biasing member 616 can be coupled between the main body 610 and the door element 614 and can be configured to bias the door element 614 toward the closed position. In the example provided, the biasing member 616 is a torsional spring disposed about the pivot 612, though other configurations and types of biasing members can be used. The biasing member 616 and door element 614 can be configured such that when the main body 610 does not rotate, or rotates about the second axis 242 at a rotational speed less than the predetermined rotational speed, the biasing member 616 maintains the door element 614 in the closed position. The biasing member 616 and door element 614 can be configured such that when the main body 610 rotates about the second axis 242 at a rotational speed equal to or greater than the predetermined rotational speed, a centrifugal force acting on the door element 614 can cause the door element 614 to move from the closed position to the open position. In the example provided, the main body 610 defines two fluid apertures 618 on opposite sides of the main body 610 and each fluid aperture 618 can be opened or closed by a respective door element 614, though the centrifugal dam 422 can employ other numbers of door elements 614 and fluid apertures 618.

Figure 8:
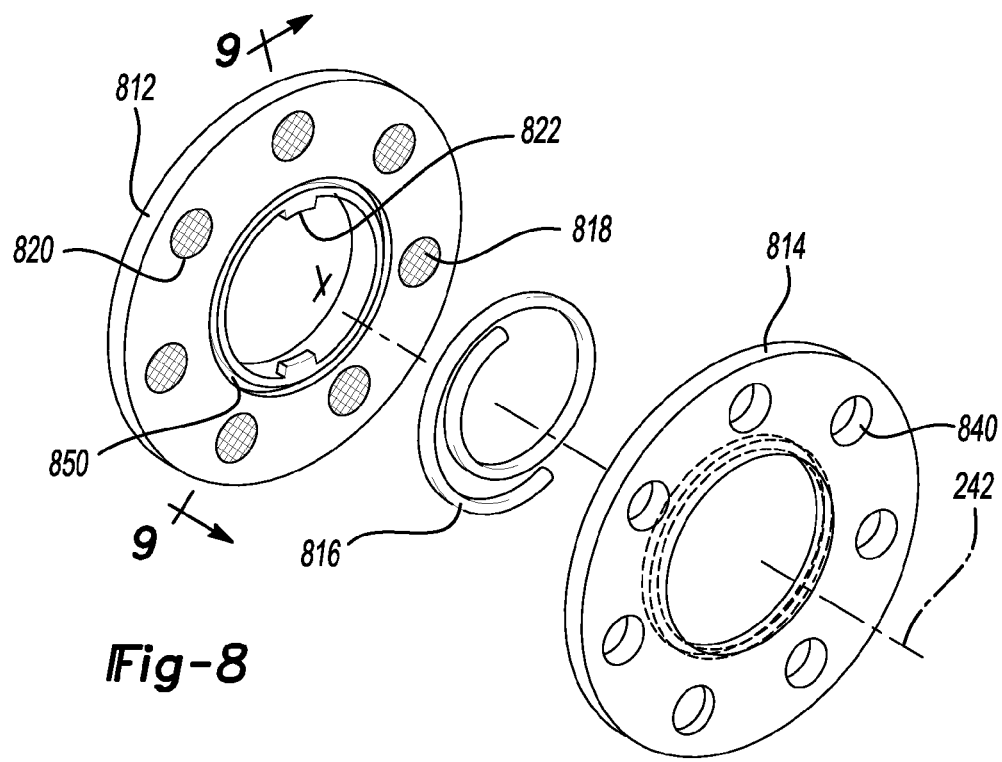
FIG. 8 is an exploded perspective view of a portion of a second drag reduction system constructed in accordance with the teachings of the present disclosure.
Figure 9:
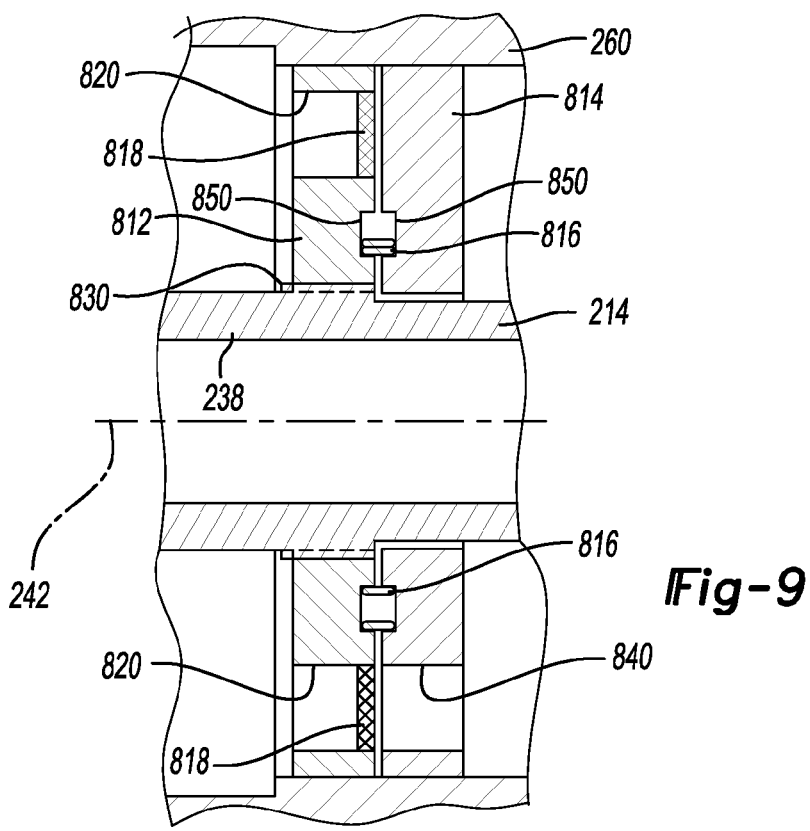
FIG. 9 is a cross-sectional view taken along the line 9-9 of FIG. 8, wherein the portion of the second drag reduction system depicted above the centerline illustrates a centrifugal dam in a first or closed condition, and wherein the portion of the second drag reduction system depicted below the centerline illustrates the centrifugal dam as in a second or open condition.

With reference to FIGS. 8 and 9, a centrifugal dam 810 of a second construction is illustrated. The centrifugal dam 810 can be used in place of centrifugal dam 422 and can be used with drag reduction system 410 or 410'. Centrifugal dam 810 can include a first body 812, a second body 814, a biasing member 816, and a screen element 818. The first body 812 can be coupled to the axially extending portion 238 of the input member 214 or the inner portion 292 of the inner clutch plate carrier 264 for common rotation about the second axis 242. In the example provided, the first body 812 is generally annular in shape and extends radially between the axially extending portion 238 and the clutch housing 260, while being rotatable relative to the clutch housing 260. The first body 812 can define a plurality of first fluid apertures 820. The first body 812 can also define a spline feature 822. The first fluid apertures 820 can extend through the first body 812. In the example provided, the first fluid apertures 820 are generally round in shape, though other configurations can be used. The spline feature 822 can couple the first body 812 for common rotation with a mating spline feature 830 disposed on the axially extending portion 238 of the input member 214.

In the example provided, the second body 814 is generally annular in shape and extends radially between the axially extending portion 238 and the clutch housing 260, while being rotatable relative to the axially extending portion 238, the clutch housing 260, and the first body 812. The second body 814 can define a plurality of second fluid apertures 840. In the example provided, the number of second fluid apertures 840 equals the number of first fluid apertures 820.

The screen 818 can be disposed in the first fluid apertures 820 or the second fluid apertures 840 to limit debris from passing through the centrifugal dam 810 while allowing fluid to pass through the centrifugal dam 810. In the example provided, the screen 818 is a wire mesh disposed in the first fluid apertures 820.

The biasing member 816 can couple the first body 812 and the second body 814. The biasing member 816 can be configured to bias the second body 814 toward a closed position (shown in the top half of FIG. 9) in which the first fluid apertures 820 do not align with the second fluid apertures 840 to inhibit fluid communication through the centrifugal dam 810. The biasing member can be received in a recess 850 defined by one or both of the first and second bodies 812, 814 to allow the first and second bodies 812, 814 to be substantially flush to inhibit fluid communication between the first and second bodies 812, 814, and thus inhibit fluid communication through the centrifugal dam 810 when in the closed position. In the example provided, the biasing member 816 is a torsional spring, though other configurations can be used. In the example provided, the biasing member 816 can be configured to limit rotation of the second body 814 relative to the first body 812 such that maximum rotation of the second body 814 corresponds to an open position (shown in bottom half of FIG. 9) that aligns the first and second fluid apertures 820, 840 to allow fluid communication through the centrifugal dam 810, though other rotationally limiting elements can be used. In the example provided, the expansion of the biasing member 816, and thus the relative rotation of the second body 814 can be limited by the size of the recess 850.

Figure 10:
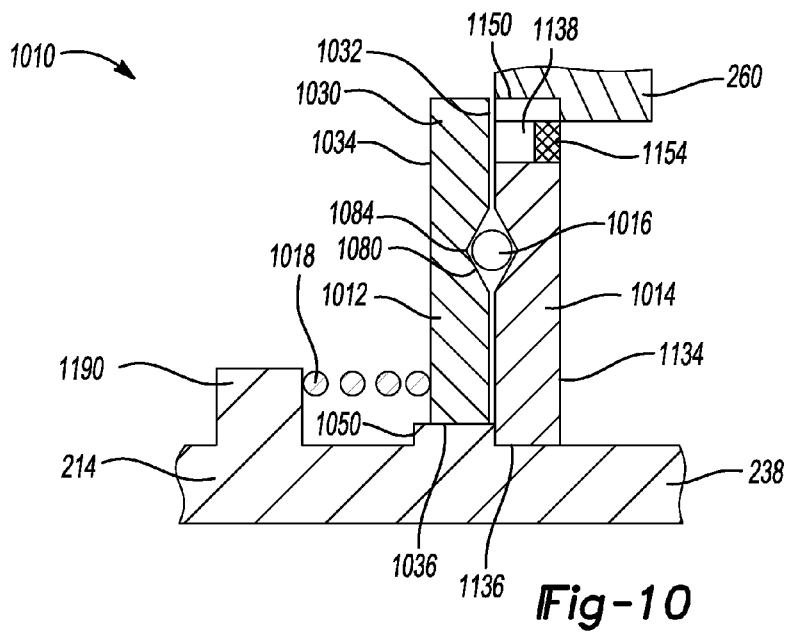
FIG. 10 is a partial cross-sectional view of a portion of a third drag reduction system constructed in accordance with the teachings of the present disclosure, the third drag reduction system having a blocking element and a filter element.
Figure 11:
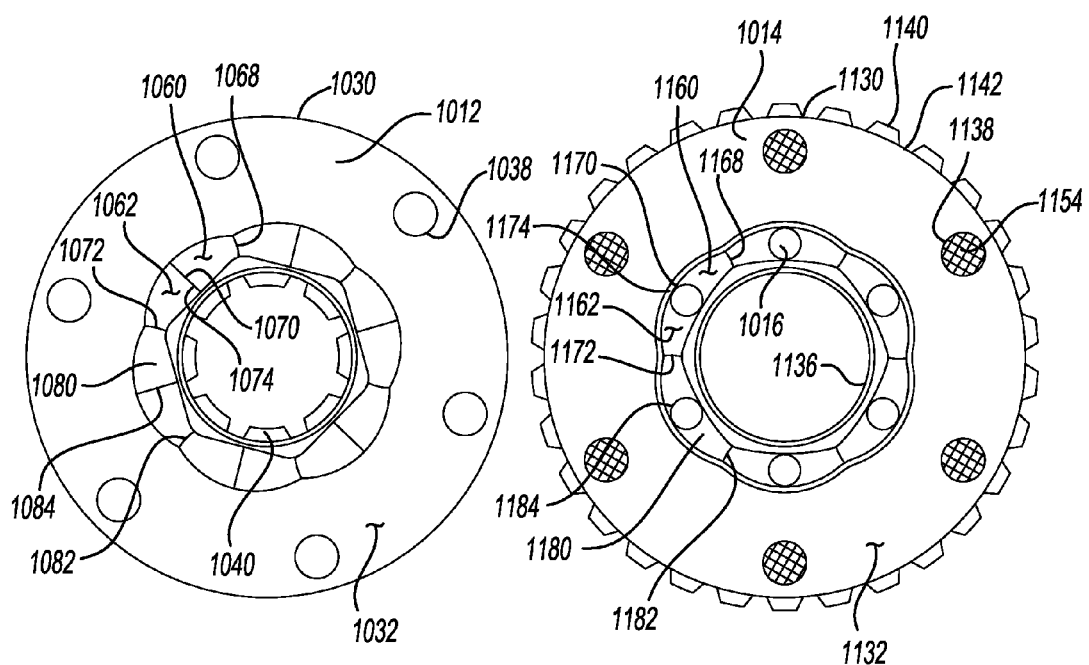
FIG. 11 is a side elevation view of the blocking element and a side elevation view of filter element of the third drag reduction system depicted in FIG. 10.

With reference to FIGS. 10 and 11, a centrifugal dam 1010 of a third construction is illustrated. The centrifugal dam 1010 can be used in place of centrifugal dam 422 or 810 and can be used with drag reduction system 410 or 410'. The centrifugal dam 1010 can include a blocking element 1012, a filter element 1014, a plurality of roller elements 1016, and a biasing member 1018. The blocking element 1012 can have a generally disc shaped body 1030 having an interior surface 1032 and an exterior surface 1034. The disc shaped body 1030 can define a central bore 1036 and a plurality of circumferentially spaced fluid bores 1038. The central bore 1036 can have an interior spline or teeth 1040 that can be formed along the interior surface of the central bore 1036. The spline 1040 can be configured to non-rotatably, but axially slidably engage a mating spline 1050 formed on the axially extending portion 238 of the input member 214. The fluid bores 1038 can penetrate through the interior surface 1032 and exterior surface 1034 to allow fluid communication through the disc shaped body 1030.

The interior surface 1032 can define a plurality of first ramps 1060 and a plurality of second ramps 1062 that can extend circumferentially around the disc shaped body 1030. The first ramps 1060 can have a first shallow end 1068 and a first deep end 1070, such that the first ramp 1060 penetrates axially deeper into the disc shaped body 1030, relative to the interior surface 1032, at the first deep end 1070 than at the first shallow end 1068. The first ramps 1060 can also narrow in the radial direction toward the first shallow end 1068 and can widen in the radial direction toward the first deep end 1070. The second ramps 1062 can have a second shallow end 1072 and a second deep end 1074, such that the second ramp 1062 penetrates axially deeper into the disc shaped body 1030, relative to the interior surface 1032, at the second deep end 1074 than at the second shallow end 1072. The second ramps 1062 can also narrow in the radial direction toward the second shallow end 1072 and can widen in the radial direction toward the second deep end 1074. The first shallow ends 1068 can be adjacent to the second shallow ends 1072 and the first deep ends 1070 can be adjacent to the second deep ends 1074, such that the first and second ramps 1060, 1062 form a continuous channel 1080 around the disc shaped body 1030 that is open to the interior surface 1032. In this way, the channel 1080 can have a plurality of peaks 1082 where the shallow ends 1068, 1072 meet and a plurality of valleys 1084 where the deep ends 1070, 1074 meet. The fluid bores 1038 can be circumferentially aligned with the peaks 1082.

The filter element 1014 can have a generally disc shaped body 1130 having an interior surface 1132 and an exterior surface 1134. The disc shaped body 1130 can define a central bore 1136 and a plurality of circumferentially spaced fluid bores 1138. The central bore 1136 can be configured to be rotatably disposed about the axially extending portion 238 of the input member 214 such that input member 214 can rotate relative to the disc shaped body 1130. In the example provided, the disc shaped body 1130 extends radially inward to the axially extending portion 238, though other configurations, such as seals (not shown) or a portion of the clutch housing 260 for example, can be disposed between the disc shaped body 1130 and the axially extending portion 238. Alternatively, the filter element 1014 can be integrally formed with the clutch housing 260. The disc shaped body 1130 can have an exterior spline or teeth 1140 that can be formed along an outer circumferential surface 1142 of the disc shaped body 1130. The spline 1140 can be configured to non-rotatably engage a mating spline 1150 formed on the clutch housing 260. The fluid bores 1138 can penetrate through the interior surface 1132 and exterior surface 1134 to allow fluid communication through the disc shaped body 1130. The fluid bores 1138 can include a screen element 1154 configured to limit debris from passing through the fluid bore 1138 while allowing fluid to pass through the fluid bore 1138. In the example provided, the screen 1154 is a wire mesh.

The interior surface 1132 can define a plurality of third ramps 1160 and a plurality of fourth ramps 1162 that can extend circumferentially around the disc shaped body 1130. The third ramps 1160 can have a third shallow end 1168 and a third deep end 1170, such that the third ramp 1160 penetrates axially deeper into the disc shaped body 1130, relative to the interior surface 1132, at the third deep end 1170 than at the third shallow end 1168. The third ramps 1160 can also narrow in the radial direction toward the third shallow end 1168 and can widen in the radial direction toward the third deep end 1170. The fourth ramps 1162 can have a fourth shallow end 1172 and a fourth deep end 1174, such that the fourth ramp 1162 penetrates axially deeper into the disc shaped body 1130, relative to the interior surface 1132, at the fourth deep end 1174 than at the fourth shallow end 1172. The fourth ramps 1162 can also narrow in the radial direction toward the fourth shallow end 1172 and can widen in the radial direction toward the fourth deep end 1174. The third shallow ends 1168 can be adjacent to the fourth shallow ends 1172 and the third deep ends 1170 can be adjacent to the fourth deep ends 1174 such that the third and fourth ramps 1160, 1162 form a continuous channel 1180 around the disc shaped body 1130 that is open to the interior surface 1132. In this way, the channel 1180 can have a plurality of peaks 1182 where the shallow ends 1168, 1172 meet and a plurality of valleys 1184 where the deep ends 1170, 1174 meet. The fluid bores 1138 can be circumferentially aligned with the valleys 1184.

The biasing member 1018 can bias the blocking element 1012 axially toward the filter element 1014. In the example provided, the biasing member 1018 is a coil spring disposed radially about the axially extending portion 238 and axially between the exterior surface 1034 of the blocking element 1012 and a lip 1190 formed on the axially extending portion 238, though other configurations can be used. The roller elements 1016 can be disposed axially between the blocking element 1012 and the filter element 1014 and configured to roll in the channels 1080, 1180. In the example provided, the roller elements 1016 are spherical bearings, though other configurations can be used.

Returning to FIGS. 1-5, during operation of the vehicle in both the 2WD and 4WD or AWD modes, the outer clutch plate carrier 262 can rotate within the clutch housing 260 in rotational direction 522 (FIGS. 5 and 6), and through the lubricant fluid in the clutch sump 424. In 4WD or AWD modes, when the clutch plates 266, 268 are engaged to transmit rotational power, the lubricant fluid provides lubrication and cooling of the clutch plates 266, 268. In 2WD mode, when the clutch plates 266, 268 are disengaged, lubrication and cooling is generally not required, and the lubricant fluid in the clutch sump 424 causes drag on the rotating outer clutch plate carrier 262 and clutch plates 266, 268. When the piston 270 is in the retracted position, the pump 274 can be operated in the second mode to continue to draw fluid from the piston chamber 284. Continuing to draw fluid in from the piston chamber 284 after the piston 270 is fully retracted, can lower the pressure in the piston chamber 284 below the pressure in the clutch sump 424. When the pressure in the piston chamber 284 is below a predetermined pressure, or the pressure differential between the clutch sump 424 and the piston chamber 284 is greater than a predetermined pressure differential, the first valve 414 can open to allow the pump to draw fluid through the sump conduit 412 from the clutch sump 424 and into the piston chamber 284. The pump 274 can draw the fluid from the piston chamber 284 into the reservoir 220. In this way, the pump 274 can remove fluid from the clutch sump 424 and pump it into the reservoir 220 to minimize drag on the outer clutch plate carrier 262. Should air be drawn into the piston chamber 284, the air can be bled from the piston chamber 284 through the bleed conduit 420 upon operation of the pump 274 in the first mode.

As the pump 274 draws more fluid into the reservoir 220 from the clutch sump 424, the second valve 418 can be configured to open to drain some fluid from the reservoir 220 into the first cavity 222. The second valve 418 can be configured to be electronically operated and to be open while the pump 274 is operated in the second mode, or can open based on conditions within the reservoir 220. The second valve 418 can also be configured to open based on fluid levels or conditions in the first or second cavities 222, 282. For example, the amount of fluid drained from the reservoir 220 to the first cavity 222 can be proportional to the amount the pump 274 pumps into the reservoir 220, to prevent the reservoir 220 from being over filled. Alternatively, the second valve 418 can open when a pressure in the reservoir 220 exceeds the predetermined reservoir pressure to prevent over pressurization of the fluid in the reservoir 220. In this way, the size of the reservoir 220 can be minimized while maintaining a reservoir 220 separate from the first and second cavities 222, 282.

As the input member 214 rotates in rotational direction 522, some of the fluid in the hypoid sump 426 can flow between the back side 236 of the input member 214 and the wall 286. The fluid can flow through the bearing 244 or through the bypass conduit 442 to the annular cavity 440. The bearing 244 can be a tapered roller bearing, for example, that can act as a pump to move the fluid axially through the annular cavity 440. The centrifugal dam 422, 810, 1010 can act to selectively inhibit or permit fluid communication through the annular cavity 440 to the second cavity 282.

With reference to FIG. 6 and centrifugal dam 422, when the input member 214 rotates at or above the predetermined rotational speed, such as when the vehicle 10 is operated in AWD mode, centrifugal forces can overcome the biasing member 616 to rotate the door element 614 about the pivot 612 and hold the door element 614 in the open position to allow fluid communication from the annular cavity 440 to the second cavity 282. When the vehicle 10 is operated in 2WD mode, the input member 214 does not rotate, and the biasing member 616 can hold the door element 614 of the centrifugal dam 422 closed to inhibit fluid communication between the annular cavity 440 and the second cavity 282. Thus, when the clutch plates 266, 268 are separated in 2WD mode, and lubrication is not needed, the fluid is inhibited from returning to the clutch sump 424 and fluid drag on the rotating outer clutch plate carrier 262 is reduced.

With reference to FIGS. 8 and 9 and centrifugal dam 810, when the first body 610 does not rotate, or rotates about the second axis 242 at a rotational speed less than a predetermined rotational speed, the biasing member 816 maintains the second body 814 in the closed position and the second body 814 can rotate with the first body 812 in the closed position. The biasing member 816 and second body 814 can be configured such that when the first body 812 rotates about the second axis 242 at a rotational speed equal to or greater than the predetermined rotational speed, the biasing member 816 can be overcome and the second body 814 can rotate relative to the first body 812 from the closed position to the open position. The biasing member can be overcome by rotational acceleration of the first body 812 relative to the second body 814, rotational momentum and/or rotational drag forces acting on the second body 814. The second body 814 can be maintained in the open position, when the first body 812 rotates at or above the predetermined rotational speed, by rotational drag forces acting on the second body 814, such as friction with the clutch housing 260, or viscous drag from the fluid for example. Alternatively, the second body 814 can be maintained in the open position by a separate mechanism (not shown). Thus, when the clutch plates 266, 268 are separated in 2WD mode, and lubrication is not needed, the fluid is inhibited from returning to the clutch sump 424 and fluid drag on the rotating outer clutch plate carrier 262 is reduced.

With reference to FIGS. 10 and 11 and centrifugal dam 1010, when the blocking element 1012 is not rotating, the roller elements 1016 can roll toward the valleys 1084, 1184 of the channels 1080, 1180 to allow the interior surfaces 1032, 1132 to abut and to seat the blocking element 1012 in a predetermined rotational position relative to the filter element 1014. The biasing member 1018 can apply pressure on the blocking element 1012 toward the filter element 1014 to encourage the rolling elements 1016 toward the valleys 1084, 1184. Since the fluid bores 1038 of the blocking element 1012 are aligned with peaks 1082 and the fluid bores 1138 of the filter element 1014 are aligned with the valleys 1184, the fluid bores 1038, 1138 are not aligned when the blocking element 1012 is in this predetermined rotational position. Thus, when the input member 214 is not rotating, the fluid bores 1038, 1138 are not aligned and fluid communication through the centrifugal dam 1010 is inhibited. When the input member 214 rotates, the roller elements 1016 can ride up the ramps 1060, 1062, 1160, 1162 toward the peaks 1082, 1182 to allow the blocking element 1012 to axially separate from the filter element 1014. This separation can allow fluid to flow through the fluid bores 1038, into the space between the blocking element 1012 and the filter element 1014, and through the fluid bores 1138 of the filter element 1014 to the clutch sump 424.

In view of the above descriptions, it will be appreciated that the drag reduction system 410 is configured to remove lubricant fluid from the clutch sump 424 of the clutch housing 260 (at least in an area where the sump conduit 412 is located) to reduce drag caused by the rotation of the outer clutch plate carrier 262 through the lubricant fluid in the clutch sump 424. The drag reduction system 410 is also configured to permit the re-introduction of lubricant fluid into the clutch sump 424 in an area where the outer and inner clutch plate carriers 262, 264 are located when the second clutch 48 is being actuated (i.e., prior to the full locking of the second clutch 48).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power transmitting component comprising:
a first output member and a second output member;
a housing defining a first sump;
an input member configured to receive rotational power and rotate about a first axis;
a differential including a differential case and a differential gearset, the differential gearset being configured to transmit rotary power between the differential case and the first and second output members;
a clutch assembly including a piston chamber, a piston, and a plurality of interleaved clutch plates, the piston being configured to move between a first position and a second position, the clutch plates being configured to rotate through the first sump and to transmit torque between the input member and the differential case when the piston is in the second position;
a reservoir configured to hold a fluid;
a pump operable in a first mode wherein the pump pumps the fluid from the reservoir to the piston chamber, and a second mode wherein the pump pumps the fluid from the piston chamber to the reservoir; and
a fluid circuit fluidly coupling the reservoir to the first sump when the piston is in the first position and the pump is operated in the second mode;
wherein the pump is configured to pump fluid from the first sump through the fluid circuit when the fluid circuit fluidly couples the first sump and the reservoir.

2. The power transmitting component of claim 1, further comprising a valve in fluid communication with the fluid circuit, the valve being configured to be open to allow the fluid to flow from the first sump to the reservoir when the piston is in the first position and the pump is operated in the second mode.

3. The power transmitting component of claim 1, further comprising a valve in fluid communication with the fluid circuit, the valve being configured to be open when a pressure differential between the first sump and the piston chamber is greater than a predetermined pressure differential.

4. The power transmitting component of claim 3, wherein the piston defines a portion of the fluid circuit, and the pump draws the fluid through the portion of the piston when the pressure differential between the first sump and the piston chamber is greater than a predetermined pressure differential.

5. The power transmitting component of claim 3, wherein the housing defines a portion of the fluid circuit, and the pump draws the fluid through the portion of the housing and into the piston chamber when the pressure differential between the first sump and the piston chamber is greater than a predetermined pressure differential.

6. The power transmitting component of claim 1, further comprising a second sump and a valve fluidly coupling the reservoir with the second sump, wherein the input member is configured to rotate through the second sump, and the valve is configured to allow fluid to flow from the reservoir to the second sump when open and to prevent fluid from flowing from the reservoir to the second sump when closed.

7. The power transmitting component of claim 6, wherein the valve is configured to be open when a volume of the fluid in the reservoir exceeds a predetermined volume, or a pressure in the reservoir exceeds a predetermined pressure.

8. The power transmitting component of claim 6, further comprising:
a centrifugal dam including a first body and a door element, the first body being coupled for common rotation with the input member, the door element being configured to move between a first door position wherein the centrifugal dam limits fluid flow through an annular cavity, and a second door position wherein the centrifugal dam permits fluid flow through the annular cavity;
wherein the annular cavity is at least partially defined by the housing and a component coupled for common rotation with the input member, the annular cavity fluidly coupling the first and second cavities; and
wherein the door element is configured to be in the first door position when the input member rotates at a rotational speed less than a predetermined rotational speed, and centrifugal force moves the door element to the second door position when the input member rotates at a rotational speed greater than or equal to the predetermined rotational speed.

9. The power transmitting component of claim 8, wherein the main body defines a fluid orifice and the centrifugal dam includes a biasing member, the biasing member biasing the door element toward the first door position, wherein the door element is configured to cover the fluid orifice when in the first door position.

10. A power transmitting component comprising:
a first output member and a second output member;
a housing defining a first sump;
an input member configured to receive rotational power and rotate about a first axis;
a differential including a differential case and a differential gearset, the differential gearset being configured to transmit rotary power between the differential case and the first and second output members;
a clutch assembly including a piston chamber, a piston, and a plurality of interleaved clutch plates, the piston being configured to move between a first position and a second position, the clutch plates being configured to rotate through the first sump and to transmit torque between the input member and the differential case when the piston is in the second position;
a reservoir configured to hold a fluid;
a pump operable in a first mode wherein the pump pumps fluid from the reservoir to the piston chamber and a second mode wherein the pump pumps fluid from the first sump to the reservoir; and
a first valve in fluid communication with the first sump and the pump, the first valve having a valve body and a valve element received in the valve body and being moveable between a first valve element position which permits fluid communication through the valve body, and a second valve element position which inhibits fluid communication through the valve body, the valve element being configured to be positioned in the first valve element position when the pump operates in the second mode.

11. The power transmitting component of claim 10, wherein the valve element is configured to move from the second valve element position to the first valve element position when a pressure in the piston chamber is equal to or less than a predetermined pressure and to move from the first valve element position to the second valve element position when the pressure in the piston chamber is greater than the predetermined pressure.

12. The power transmitting component of claim 11, wherein the pump is in fluid communication with the piston chamber when operated in the second mode, and the pump is configured to reduce the pressure within the piston chamber below the predetermined pressure when operated in the second mode.

13. The power transmitting component of claim 10 wherein the piston defines a sump conduit fluidly coupling the first sump and the piston chamber, and the first valve is fluidly coupled to the sump conduit to permit fluid flow through the sump conduit when the valve element is in the first valve element position and inhibit fluid flow through the sump conduit when the valve element is in the second valve element position.

14. The power transmitting component of claim 10 wherein the housing defines a sump conduit fluidly coupling the first sump and the piston chamber, and the first valve is fluidly coupled to the sump conduit to permit fluid flow through the sump conduit when the valve element is in the first valve element position and inhibit fluid flow through the sump conduit when the valve element is in the second valve element position.

15. The power transmitting component of claim 10, further comprising a second sump and a second valve fluidly coupling the reservoir with the second sump, wherein the input member is configured to rotate through the second sump, and the second valve is configured to allow fluid to flow from the reservoir to the second sump when the second valve is open and to prevent fluid from flowing from the reservoir to the second sump when the second valve is closed.

16. The power transmitting component of claim 15, wherein the second valve is configured to be open when a volume of the fluid in the reservoir exceeds a predetermined volume, or a pressure in the reservoir exceeds a predetermined pressure.

17. The power transmitting component of claim 15, further comprising:
a centrifugal dam including a first body and a door element, the first body being coupled for common rotation with the input member, the door element being configured to move between a first door position wherein the centrifugal dam limits fluid flow through an annular cavity, and a second door position wherein the centrifugal dam permits fluid flow through the annular cavity;
wherein the annular cavity is at least partially defined by the housing and a component coupled for common rotation with the input member, the annular cavity fluidly coupling the first and second cavities; and
wherein the door element is configured to be in the first door position when the input member rotates at a rotational speed less than a predetermined rotational speed, and centrifugal force moves the door element to the second door position when the input member rotates at a rotational speed greater than or equal to the predetermined rotational speed.

18. A power transmitting component comprising:
a first output member and a second output member;
a housing defining a first sump, a second sump;
an input member configured to receive rotational power and rotate through the second sump about a first axis;
a differential including a differential case and a differential gearset, the differential gearset being configured to transmit rotary power between the differential case and the first and second output members;
a clutch assembly including a piston chamber, a piston, and a plurality of interleaved clutch plates, the piston being configured to move between a first position and a second position, the clutch plates being configured to rotate through the first sump and to transmit torque between the input member and the differential case when the piston is in the second position; and
a centrifugal dam including a first body and a door element, the first body being coupled for common rotation with the input member, the door element being configured to move between a first door position wherein the centrifugal dam limits fluid flow through an annular cavity, and a second door position wherein the centrifugal dam permits fluid flow through the annular cavity;
wherein the annular cavity is at least partially defined by the housing and a component coupled for common rotation with the input member, the annular cavity fluidly coupling first and second cavities; and
wherein the door element is configured to be in the first door position when the input member rotates at a rotational speed less than a predetermined rotational speed, and centrifugal force moves the door element to the second door position when the input member rotates at a rotational speed greater than or equal to the predetermined rotational speed.

19. The power transmitting component of claim 18, further comprising:
a piston chamber, wherein the piston is moveable within the piston chamber between the first and second positions;
a reservoir;
a pump configured to be operated in a first mode wherein the pump pumps fluid from the reservoir to the piston chamber and a second mode wherein the pump pumps fluid from the first sump to the reservoir; and
a first valve in fluid communication with the first sump and the pump, the first valve having a valve body and a valve element received in the valve body and being moveable between a first valve element position which permits fluid communication through the valve body, and a second valve element position which inhibits fluid communication through the valve body, the valve element being configured to be positioned in the first valve element position when the pump operates in the second mode;
wherein the first valve element is configured to move from the second valve element position to the first valve element position when a pressure differential between the first sump and the piston chamber is greater than a predetermined pressure differential.

20. The power transmitting component of claim 19, further comprising a second valve fluidly coupling the reservoir with the second sump, wherein the second valve is configured to allow fluid to flow from the reservoir to the second sump when the second valve is open and prevent fluid from flowing from the reservoir to the second sump when the second valve is closed.

* * * * *